US012679250B2

(12) United States Patent
Shin et al.

(10) Patent No.: US 12,679,250 B2
(45) Date of Patent: Jul. 14, 2026

(54) SEAT CROSS MEMBER ASSEMBLY AND METHOD OF ASSEMBLING THE SAME

(71) Applicants: Hyundai Motor Company, Seoul (KR); Kia Corporation, Seoul (KR)

(72) Inventors: Seong Su Shin, Seoul (KR); Tae Soo Park, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 376 days.

(21) Appl. No.: 18/356,664

(22) Filed: Jul. 21, 2023

(65) Prior Publication Data

US 2024/0375549 A1 Nov. 14, 2024

(30) Foreign Application Priority Data

May 9, 2023 (KR) ........................ 10-2023-0060110

(51) Int. Cl.
B60N 2/015 (2006.01)
B60N 2/68 (2006.01)
(52) U.S. Cl.
CPC ............. B60N 2/015 (2013.01); B60N 2/682 (2013.01)
(58) Field of Classification Search
CPC ..................................................... B60N 2/015
See application file for complete search history.

(56) References Cited

U.S. PATENT DOCUMENTS

| | | | | |
|---|---|---|---|---|
| 11,351,890 | B2 | 6/2022 | Park et al. | |
| 12,202,325 | B2 * | 1/2025 | Jeong | B62D 25/2018 |
| 2019/0291556 | A1 * | 9/2019 | Caliskan | B60K 1/04 |
| 2020/0031399 | A1 * | 1/2020 | Matsuda | B62D 25/2036 |
| 2020/0101879 | A1 * | 4/2020 | Sakai | B60N 2/502 |
| 2021/0170915 | A1 | 6/2021 | Park et al. | |
| 2024/0336164 | A1 * | 10/2024 | Jeong | B60R 16/04 |

FOREIGN PATENT DOCUMENTS

| | | | | | |
|---|---|---|---|---|---|
| FR | 3028461 | A1 * | 5/2016 | | F16B 5/02 |
| JP | 6887469 | B2 * | 6/2021 | | |
| KR | 20210071619 | A | 6/2021 | | |
| WO | WO-2013183360 | A1 * | 12/2013 | | B62D 29/048 |
| WO | WO-2018212161 | A1 * | 11/2018 | | B62D 25/20 |

* cited by examiner

*Primary Examiner* — Robert E Fuller
(74) *Attorney, Agent, or Firm* — Slater Matsil, LLP

(57) ABSTRACT

A seat cross member assembly for a vehicle includes a seat cross lower member coupled to a lower portion of a floor panel and a seat cross upper member coupled to an upper portion of the floor panel. A vehicle includes a vehicle body including a pair of rear side members on each side of the vehicle body in a vehicle width direction, a seat rail, and a floor panel, a seat cross lower member coupled to a lower portion of the floor panel and having both ends coupled to lower ends of the pair of rear side members, respectively, and a seat cross upper member coupled to an upper portion of the floor panel and having both ends coupled to upper ends of the pair of rear side members, respectively.

20 Claims, 12 Drawing Sheets

FIG. 2
(Prior Art)

TENSILE LOAD
COMPRESSIVE LOAD
FRONT END LOAD

→ TENSILE LOAD
⋯⋯► COMPRESSIVE LOAD
—·—► FRONT END LOAD

1

SEAT CROSS MEMBER ASSEMBLY AND METHOD OF ASSEMBLING THE SAME

CROSS-REFERENCE TO RELATED APPLICATIONS

This application claims the benefit of Korean Patent Application No. 10-2023-0060110, filed on May 9, 2023, which application is hereby incorporated herein by reference.

TECHNICAL FIELD

The present disclosure relates to a seat cross member assembly and a method of assembling the same.

BACKGROUND

A vehicle seat is mounted on a seat cross member 13 that is one of the strongest members as illustrated in FIGS. 1 and 2 when mounted on a vehicle body. The seat cross member 13 is a side sill for supporting a load of a vehicle in a front-rear direction and for securing stiffness or is a transverse skeletal member connecting a rear side member 12 in a left-right direction and functions to support the seat to be stably mounted.

The seat mounting requires a strength for the seat to be stably fixed to the vehicle body when a sudden behavior (collision situation, sudden turning, or acceleration/deceleration) of the vehicle occurs. A strength of a seat belt anchor is prescribed in European and domestic regulations to be non-deformable under the application standard of 20 times a shoulder, pelvis, and seat load of a 3-point type belt, and a management goal during development is managed at 120% of the legal load in consideration of stiffness. Conventional vehicles position the seat cross member 13 on an upper end of a floor 11 to mount the seat and in particular, in the case of full flat floor electric vehicles, a load direction functions as a load in a tensile direction in which the seat cross member 13 and the floor 11 are separated, and thus there is a problem that it is difficult to satisfy the seat belt anchor regulations.

That is, the disadvantage of the conventional structure is that since a seat rail is coupled to the seat cross member 13, and the seat cross member 13 is separately coupled to the floor 11, there is a problem that the welding of the seat cross member 13 and the floor 11 is broken when the load of the seat belt anchor pulling the seat rail is generated. As a method for overcoming this, there is a method of increasing a welding coupling strength of the seat cross member 13 and the floor 11 more than a coupling strength of the seat rail and the seat cross member 13, but this is an inefficient method that causes an excessive increase in the number of welding flanges and welds.

Matters described above in this background section are intended to help understanding of the background of embodiments of the disclosure and may include matters not related to the related art already known to those skilled in the art to which this technology pertains.

SUMMARY

The present disclosure relates to a seat cross member assembly and a method of assembling the same. Particular embodiments relate to a seat cross member assembly mounted on a floor panel under a vehicle seat and a method of assembling the same.

Embodiments of the present disclosure can solve problems in the art and provide a seat cross member assembly and a method of assembling the same capable of overcoming a phenomenon in which a seat cross member is separated by allowing a load direction to simultaneously operate as tension and compression.

In accordance with one embodiment of the present disclosure, a seat cross member assembly mounted on a floor panel of a vehicle and coupled to a seat rail includes a seat cross lower member coupled to a lower portion of the floor panel and a seat cross upper member coupled to an upper portion of the floor panel.

In addition, the seat cross lower member may have each of both ends coupled to one of lower ends of a pair of rear side members, and the seat cross upper member may have each of both ends coupled to one of upper ends of the pair of rear side members.

In addition, the seat cross member assembly may further include a plurality of bulk heads mounted on the seat cross lower member and coupled to the floor panel.

Here, the plurality of bulk heads may be welded on the seat cross lower member.

In addition, a nut hole may be formed in each of the plurality of bulk heads, and the seat cross member assembly may further include each of a plurality of pipe nuts passed through each of a plurality of nut holes and through each of a plurality of fastening holes formed in the floor panel, which correspond to each of the plurality of nut holes.

In addition, the seat cross lower member may be formed of a lower end, an extension extending upward from both ends of the lower end in a width direction, and an upper end connected to the extension to form a stepped portion with the lower end, and in contact with a lower surface of the floor panel.

Here, each of the plurality of bulk heads may have a lower end mounted on the lower end of the seat cross lower member and an upper end in contact with a lower end of the floor panel.

In addition, the seat cross upper member may be formed of a lower end in contact with an upper surface of the floor panel, an extension extending upward from both ends of the lower end of the seat cross upper member in a width direction, and an upper end connected to the extension of the seat cross upper member to form a stepped portion with the lower end of the seat cross upper member.

Here, the seat cross upper member may be fastened to the pipe nut by a fastening bolt passing through a fastening hole formed in the upper end of the seat cross upper member.

Meanwhile, each of the plurality of pipe nuts passes through each of the plurality of fastening holes formed in the seat cross lower member, each of the plurality of nut holes formed in the bulk heads, and each of the plurality of fastening holes formed in the floor panel.

Next, in accordance with another embodiment of the present disclosure, a method of assembling a seat cross member assembly mounted on a floor panel of a vehicle and coupled to a seat rail includes coupling each of both ends of a seat cross lower member to one of lower ends of a pair of rear side members, mounting a plurality of bulk heads on the seat cross lower member, assembling the floor panel so that each of a plurality of pipe nuts passing through each of the plurality of nut holes formed in the plurality of bulk heads passes through each of a plurality of fastening holes formed to correspond to the floor panel, corresponding the plurality of fastening holes formed in a seat cross upper member to the plurality of nut holes and coupling each of both ends to one of upper ends of the pair of rear side members, and allowing each of a plurality of fastening bolts passing through the seat rail to pass through the plurality of fastening holes formed in the seat cross upper member and to be fastened to the plurality of pipe nuts.

In addition, the mounting of the bulk head may include mounting a lower end of the bulk head on a lower end of the seat cross lower member, and an upper end of the bulk head may be in contact with a lower end of the floor panel by the assembling of the floor panel.

In addition, the plurality of fastening holes may be formed in an upper end of the seat cross upper member.

Meanwhile, the assembling of the floor panel may include performing assembling by allowing each of the plurality of pipe nuts to pass through each of the plurality of fastening holes formed in the seat cross lower member and through each of the plurality of nut holes and each of the plurality of fastening holes formed in the floor panel.

According to the seat cross member assembly and the method of assembling the same according to embodiments of the present disclosure, it is possible to respond to the larger load seat belt anchor load condition that is not solved by the conventional seat cross member structure (structure to which the seat cross member is applied above the floor).

In addition, it is possible to solve a problem of an excessively increased cost and weight (the increased thickness, the increased length of the connection flange, and increased spot welding) required for responding to the seat belt anchor load by the conventional structure.

In addition, it is possible to increase the torsional stiffness of the vehicle by the cross member structure capable of simultaneously supporting the upper and lower portions of the rear side member.

In addition, the seat rail has the structure that is simultaneously fastened to the upper and lower seat cross members upon fastening and it is advantageous for the sensitivity of the seat vibration upon traveling, and thus it is possible to improve the ride comfort.

BRIEF DESCRIPTION OF THE DRAWINGS

Figure 2:
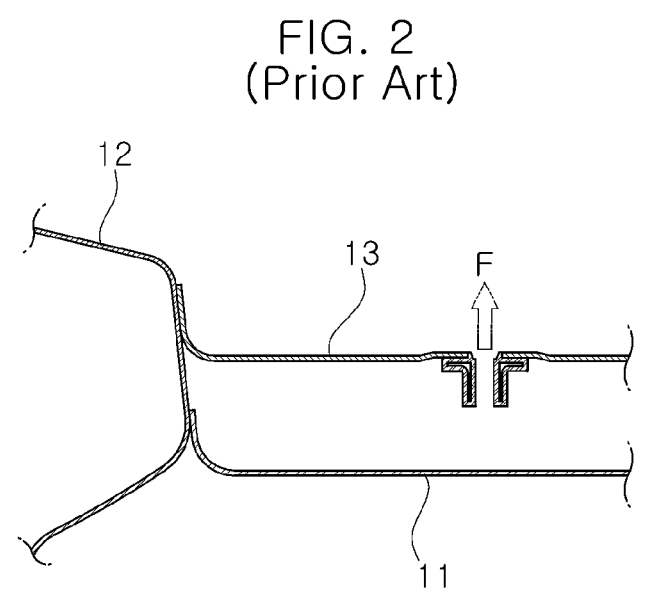

FIG. 2 is a cross-sectional view of FIG. 1.

DETAILED DESCRIPTION OF ILLUSTRATIVE EMBODIMENTS

For a full understanding of embodiments of the present disclosure, operational advantages of embodiments of the present disclosure, and objects to be achieved by practicing embodiments of the present disclosure, reference should be made to the accompanying drawings, which illustrate preferred embodiments of the present disclosure, and contents described in the accompanying description.

In describing the preferred embodiments of the present disclosure, a description of known techniques or repetitive descriptions that may unnecessarily obscure the gist of embodiments of the present disclosure will be reduced or omitted.

Figure 1:
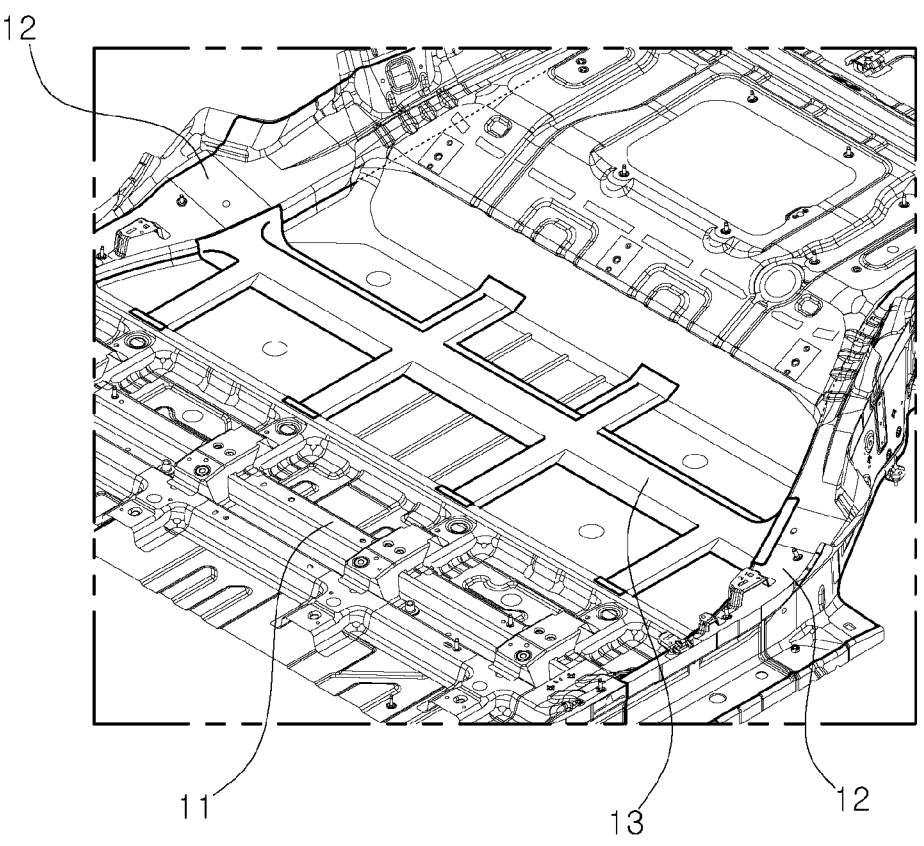
FIG. 1 illustrates a conventional seat cross member.
Figure 3:
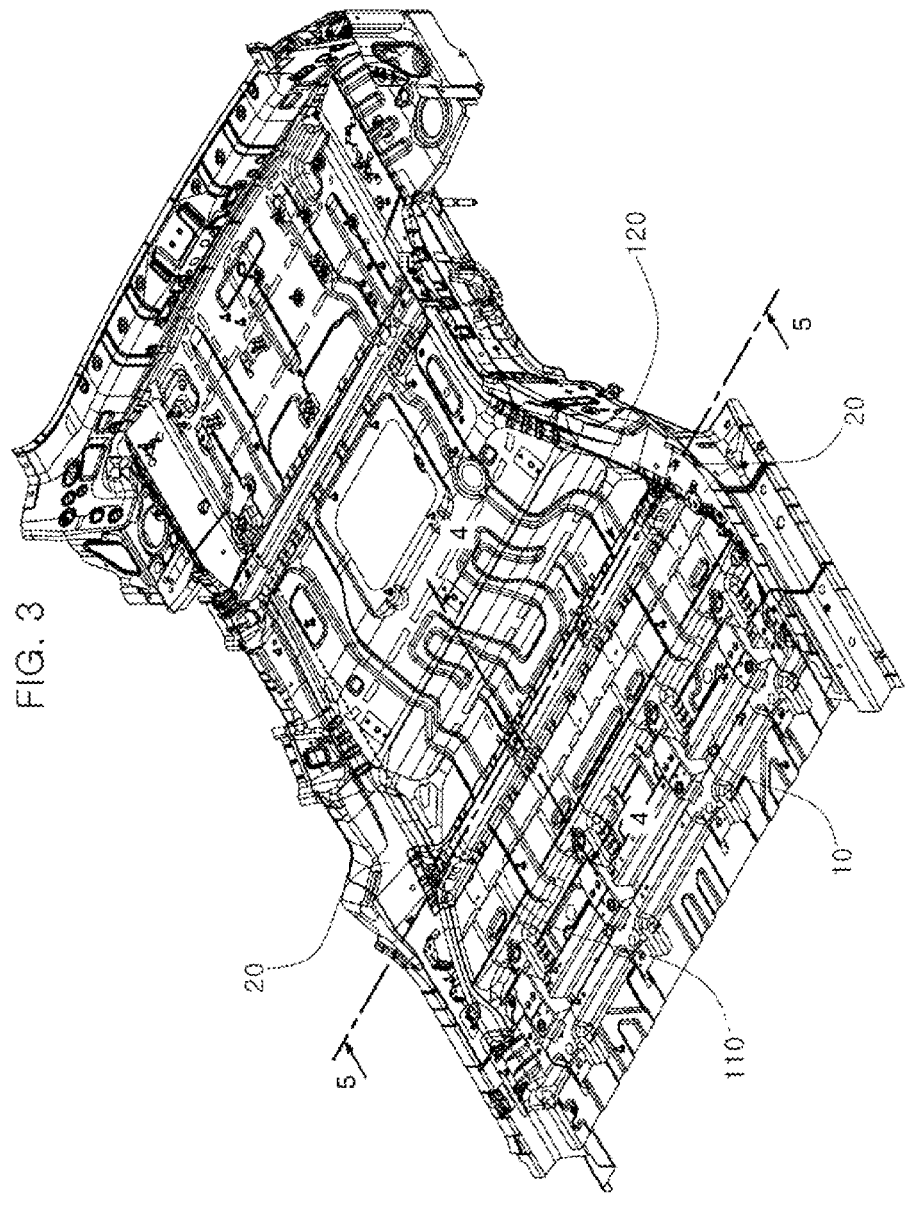
FIG. 3 illustrates a seat cross member assembly according to an embodiment of the present disclosure.
Figure 4:
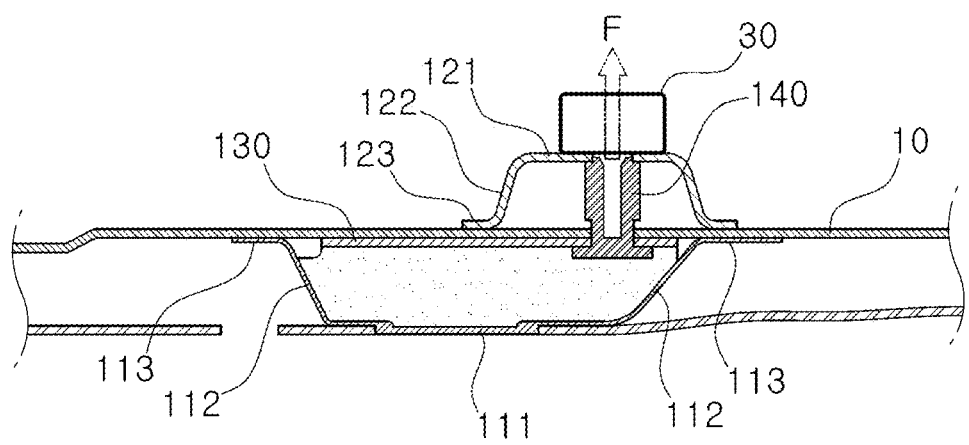
FIG. 4 is a cross-sectional view along line 4-4 in FIG. 3.
Figure 5:
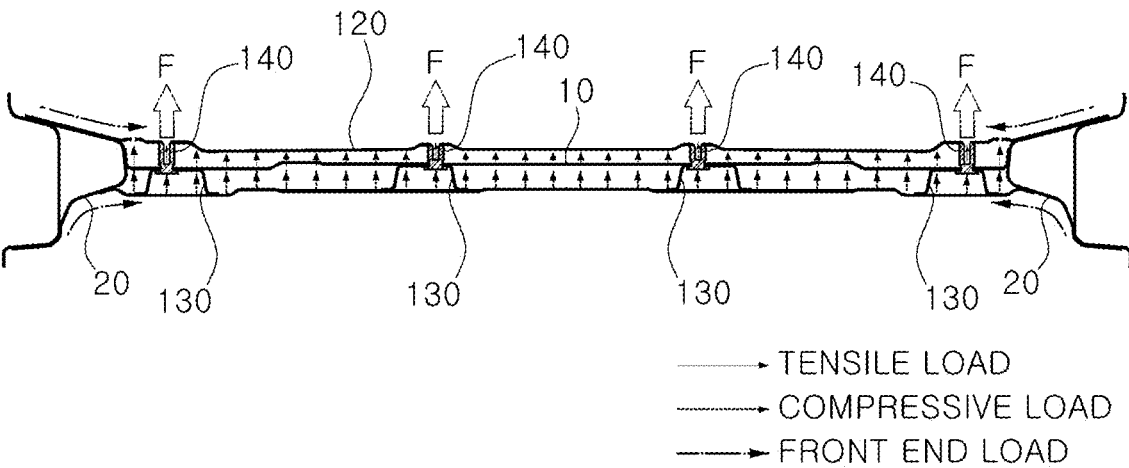
FIG. 5 is a cross-sectional view along line 5-5 in FIG. 3.
Figure 6:
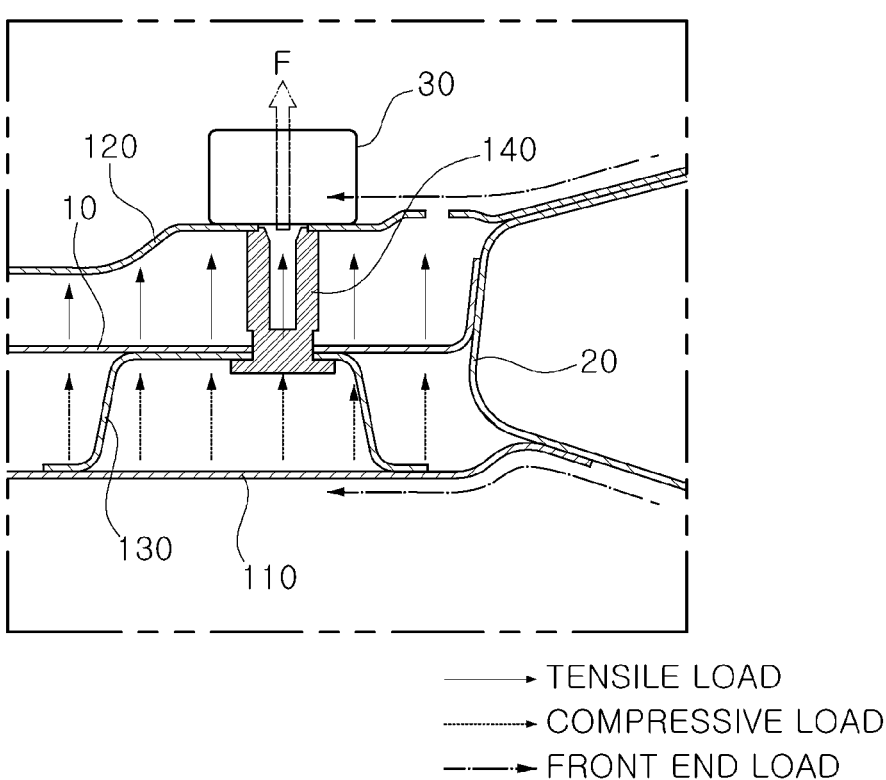
FIG. 6 is an enlarged view of a part of FIG. 5.
Figure 7:
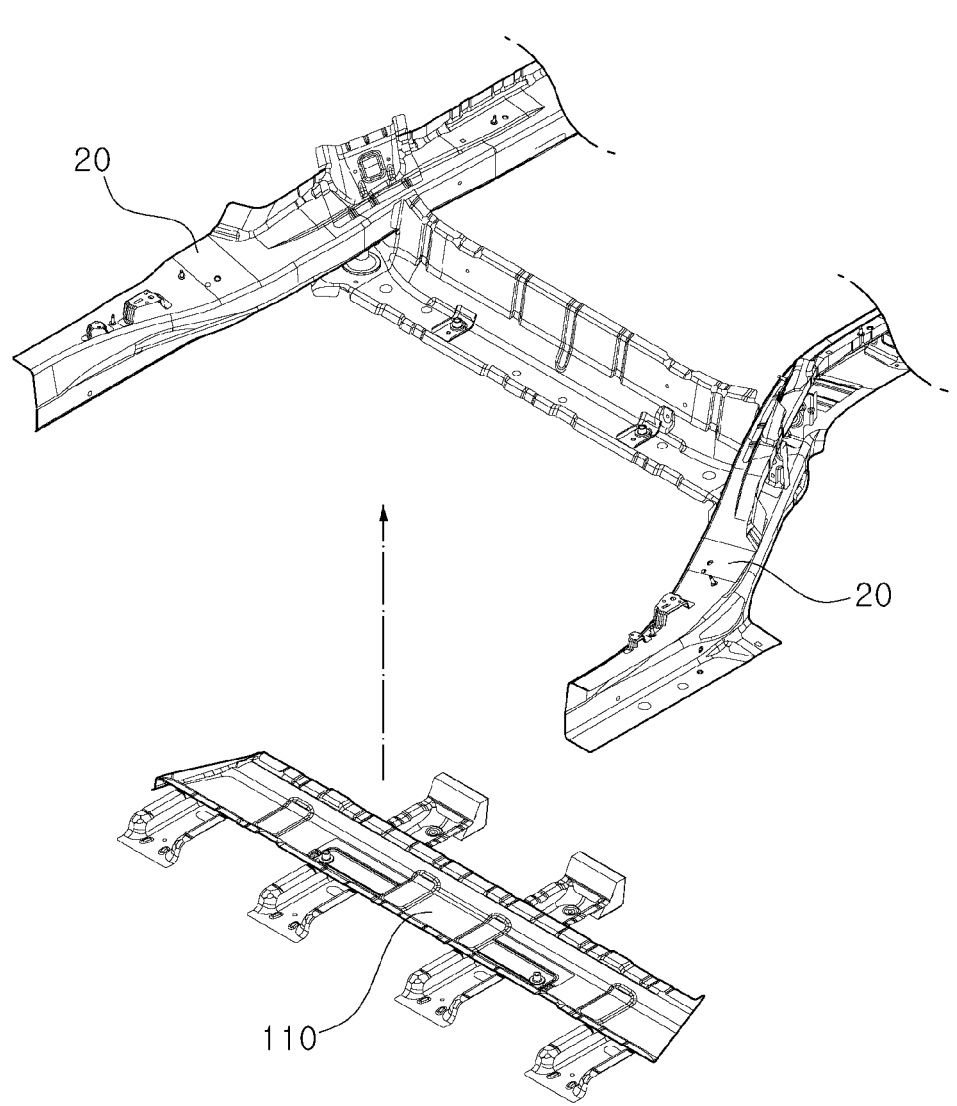
FIGS. 7 to 11 sequentially illustrate a process of assembling the seat cross member assembly according to an embodiment of the present disclosure.
Figure 8:
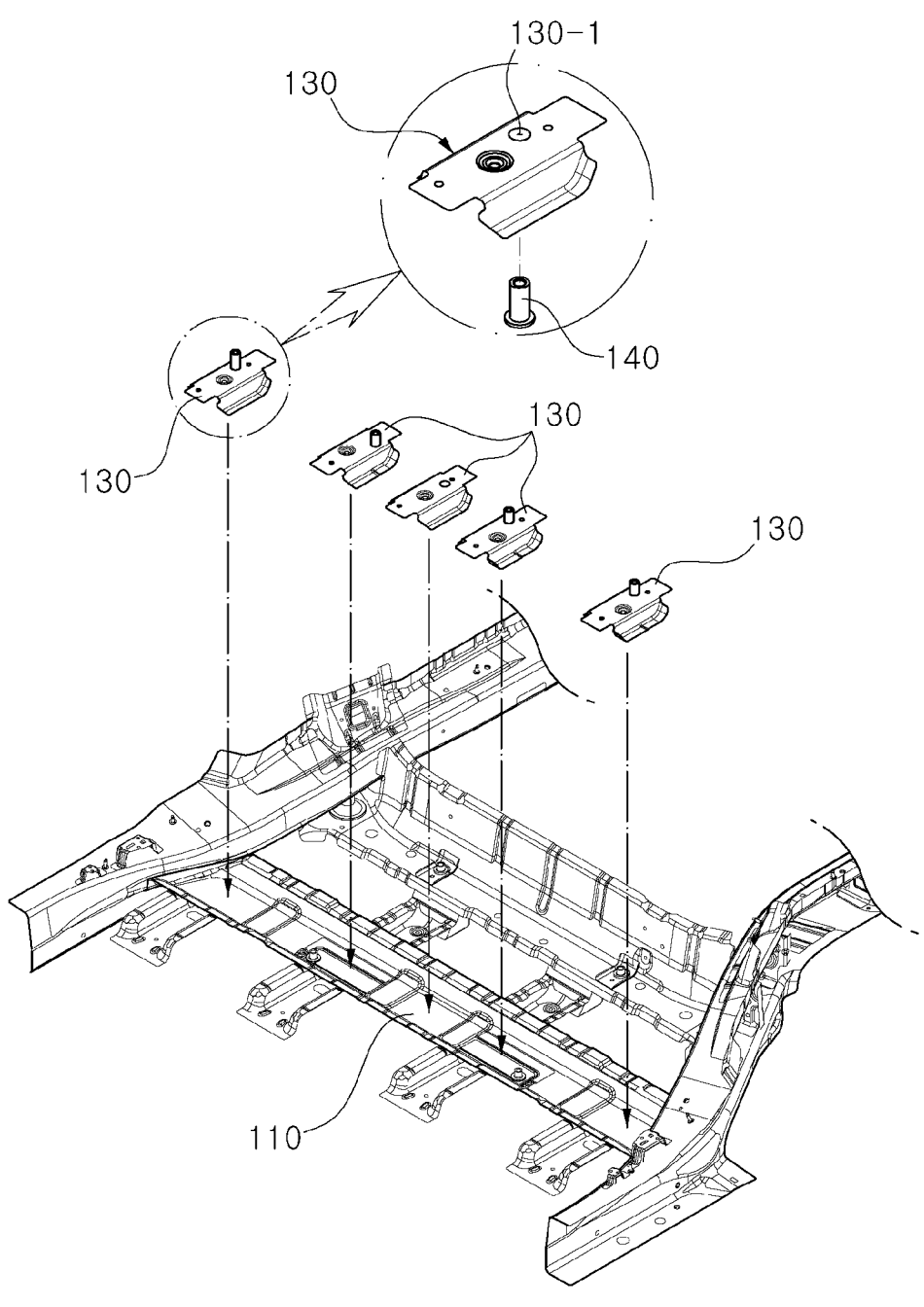
Figure 9:
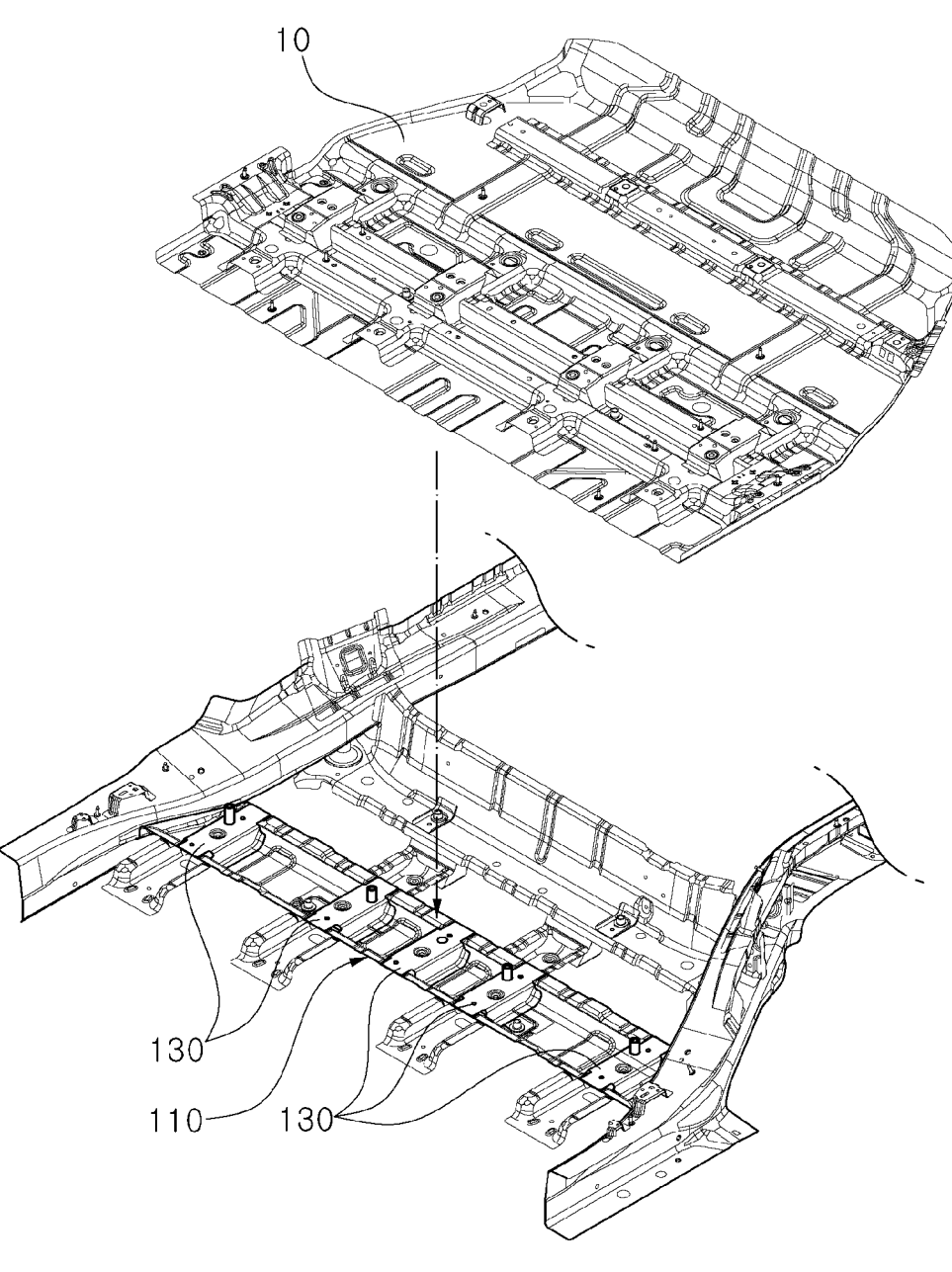
Figure 10:
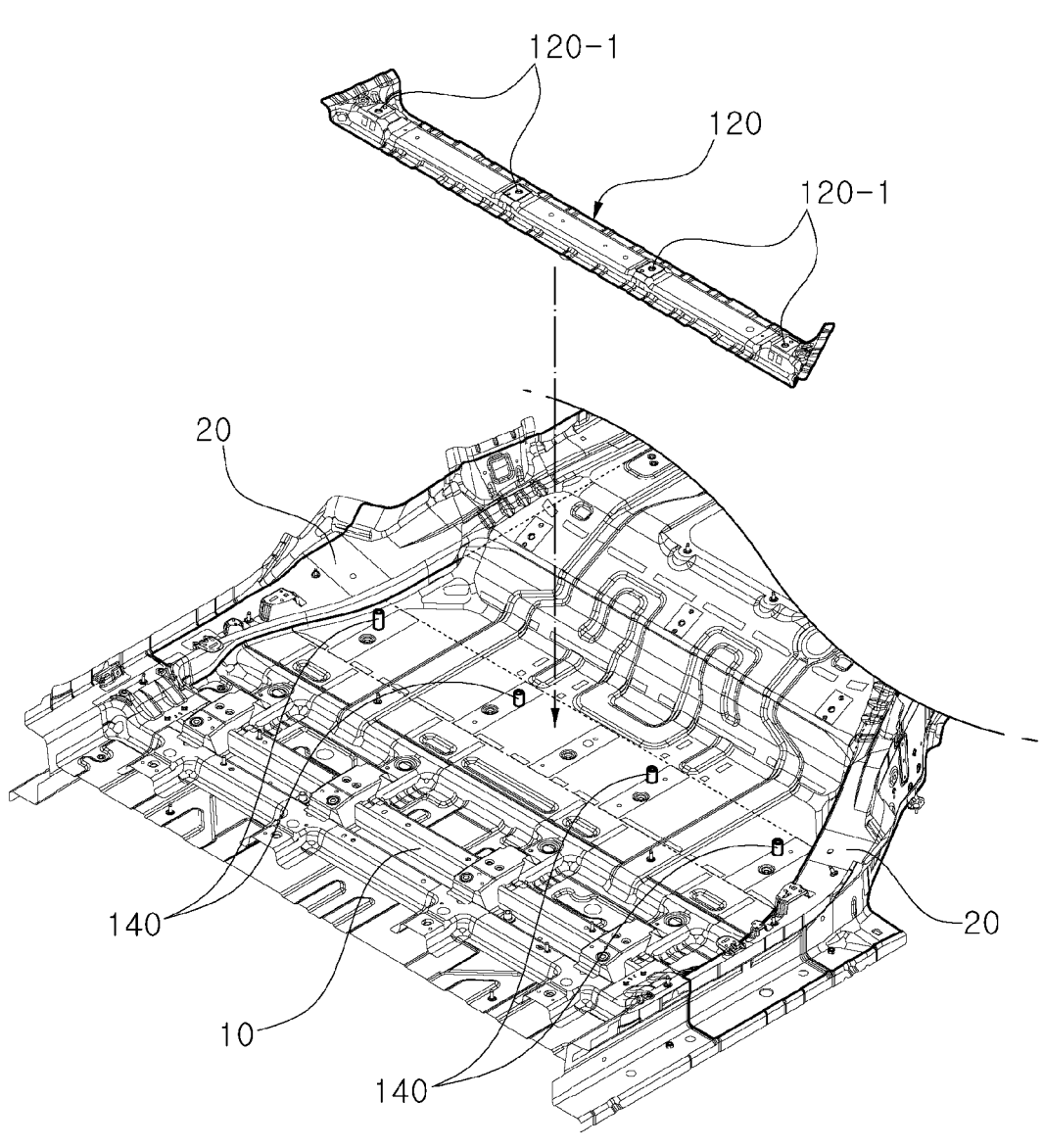
Figure 11:
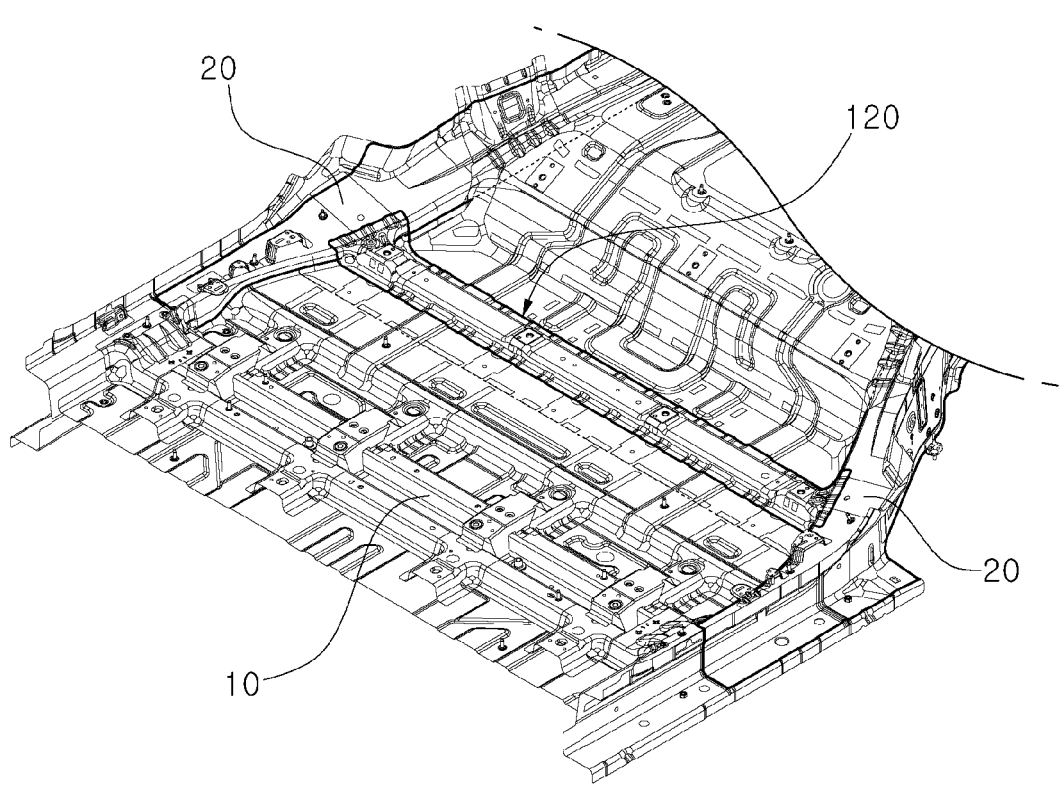

FIG. 3 illustrates a seat cross member assembly according to an embodiment of the present disclosure, and FIG. 4 is a cross-sectional view along line 4-4 in FIG. 3. FIG. 5 is a cross-sectional view along line 5-5 in FIG. 3, and FIG. 6 is an enlarged view of a part of FIG. 5.

Hereinafter, a seat cross member assembly and a method of assembling the same according to one embodiment of the present disclosure will be described with reference to FIGS. 3 to 6.

The seat cross member assembly according to an embodiment of the present disclosure is mounted on a floor panel 10 to support a seat rail 30, and embodiments of the present disclosure secure a seat mounting strength.

That is, in order to increase a coupling stiffness of the seat cross member with the floor panel 10, the seat cross member assembly according to embodiments of the present disclosure includes a seat cross lower member 110 coupled to a lower portion of the floor panel 10, a seat cross upper member 120 coupled to an upper portion of the floor panel 10, and a plurality of bulk heads 130 mounted on the seat cross lower member 110 and coupling the seat cross lower member 110, the floor panel 10, and the seat cross upper member 120.

That is, the seat cross member assembly according to embodiments of the present disclosure applies a structure in which the seat rail, the seat cross member, and the floor are all fastened when the seat rail is fastened by arranging the seat cross members on upper and lower ends of the floor panel 10 and positioning a seat mounting hardware on the bulk head of the lower seat cross member. Therefore, even when a seat belt anchor load is applied, a compressive load may be applied to the seat cross lower member 110 and the floor panel 10, and a tensile load may be simultaneously applied to the seat cross upper member 120, thereby preventing welding breakage. In addition, the upper and lower seat cross members may operate in a closed cross-section structure that simultaneously supports upper and lower ends of a rear side member 20, thereby greatly contributing to a torsional stiffness of a vehicle.

The seat cross lower member 110 is disposed under the floor panel 10, and each of both ends thereof is coupled to one of lower ends of the rear side members 12 at both sides thereof.

The seat cross lower member 110 is formed of a lower end 111, an extension 112 extending upward from both ends of the lower end 111 in a width direction, and an upper end 113 connected to the extension 112 to form a stepped portion with the lower end 111 and in contact with a lower surface of the floor panel 10.

The plurality of bulk heads 130 are configured so that lower ends are coupled to the lower end 111 of the seat cross lower member 110 by welding or the like and upper ends are seated on the upper end 113 of the seat cross lower member 110, and thus the upper ends of the plurality of bulk heads 130 are in contact with the lower surface of the floor panel 10.

Nut holes 130-1 are formed in the bulk heads 130, and fastening holes are formed in the floor panel 10 to correspond to the nut holes 130-1, and likewise, fastening holes 120-1 are also formed in the seat cross upper member 120.

Furthermore, in order to mount the seat cross lower member 110, the floor panel 10, and the seat cross upper member 120, pipe nuts 140 are inserted into the nut holes 130-1 from a lower direction of the bulk heads 130, pass through the fastening holes of the floor panel 10, and are fastened by fastening bolts 150 passing through the fastening holes 120-1 of the seat cross upper member 120.

Then, the seat cross upper member 120 is disposed under the floor panel 10, and each of both ends thereof is coupled to one of upper ends of the rear side members 12 at both sides thereof.

The seat cross upper member 120 is formed of a lower end 123 in contact with an upper surface of the floor panel 10, an extension 122 extending upward from both ends of the lower end 123 in a width direction, and an upper end 121 connected to the extension 122 to form a stepped portion with the lower end 123.

In addition, it is preferable that the fastening holes 120-1 are formed, the pipe nuts 140 are inserted through the fastening holes 120-1, and the fastening holes 120-1 are formed on the upper end 123.

Furthermore, a mounting structure is completed by fastening the fastening bolt 150 passing through the seat rail 30 mounted on an upper surface of the upper end 123 of the seat cross upper member 120 to the pipe nut 140.

Therefore, as illustrated in the drawing, when a load F pulling upward, such as a seat belt anchor load, is applied, a load is transmitted in a direction of pulling the pipe nut 140 and the bulk head 130. This functions to distribute a load direction of the seat cross lower member 110 in a compressive direction and a load direction of the seat cross upper member 120 in a tensile direction when viewed from the floor panel 10. In addition, the cross member simultaneously supports the rear side member 20 and the upper and lower surfaces of the cross member. Due to such a load distribution structure, welding breakage can be prevented by complexly changing the load direction compared to the conventional structure that supports the seat belt anchor load only with the tensile load.

FIGS. 7 to 11 sequentially illustrate a process of assembling the seat cross member assembly according to an embodiment of the present disclosure.

First, the seat cross lower member 110 is first assembled by a method of supporting the lower end of the rear side member 20. In addition, the pipe nuts 140 are inserted into the nut holes 130-1 of the bulk heads 130, and the lower ends of the bulk heads 130 are assembled to the upper surface of the lower end 111 of the seat cross lower member 110 by welding or the like. Then, the floor panel 10 is assembled by the pipe nuts 140 passing through the fastening holes, and the seat cross upper member 120 is assembled to the upper surface of the floor panel 10 and supports the upper ends of the rear side members 20.

Figure 12:
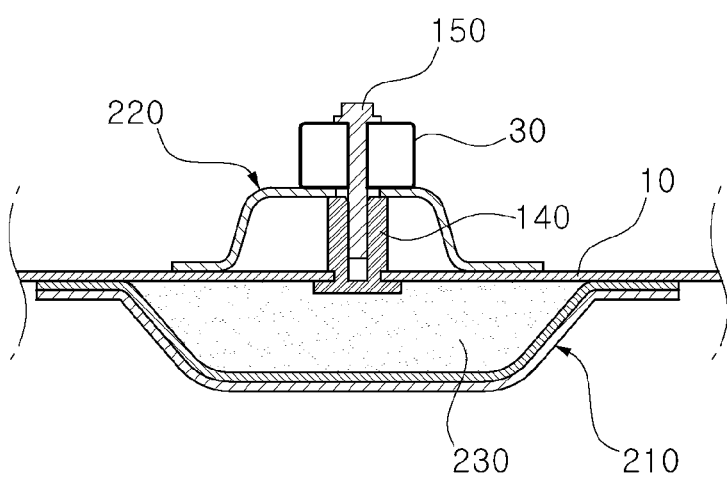
FIGS. 12 to 14 sequentially illustrate application examples of the seat cross member assembly according to embodiments of the present disclosure.
Figure 13:
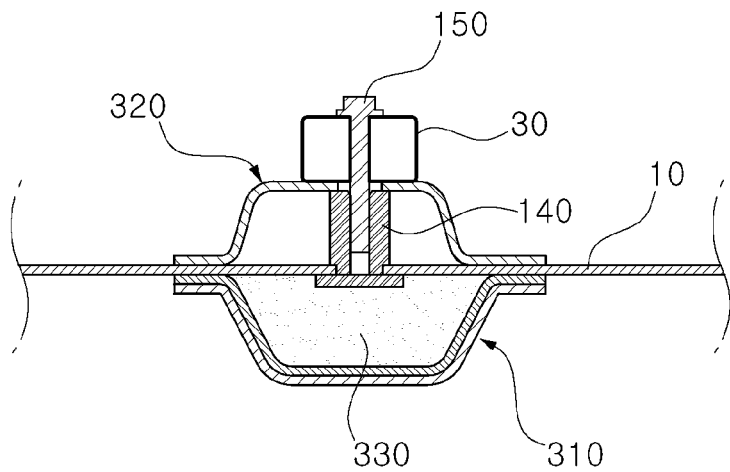

FIGS. 12 and 13 illustrate application examples of the seat cross member assembly according to embodiments of the present disclosure, and only contents different from the above-described embodiments will be described.

The cross sections of the seat cross lower member and the seat cross upper member are spaced apart from each other in the above-described embodiment, while the embodiments of FIGS. 12 and 13 are modified embodiments in which the cross sections of the seat cross lower member and the seat cross upper member are aligned. With this modification, it is possible to respond to the layout for each vehicle by controlling whether to align the seat cross members when responding to the layout for each vehicle.

First, the embodiment of FIG. 12 is a case in which a nut hole is formed at the center of an upper end of the bulk head 230. Therefore, the seat cross lower member 210, the seat cross upper member 220, and the floor panel 10 are mounted by the bulk head 230.

In addition, the embodiment of FIG. 13 is a case in which a width of the lower end of a seat cross lower member 310 and a width of the upper end of a seat cross upper member 320 are configured to approximately correspond to each other. A width of a bulk head 330 may also be adjusted accordingly.

Even in this case, as illustrated in FIG. 12, it is preferable that the nut hole is formed at the center of an upper end of the bulk head 330.

Figure 14:
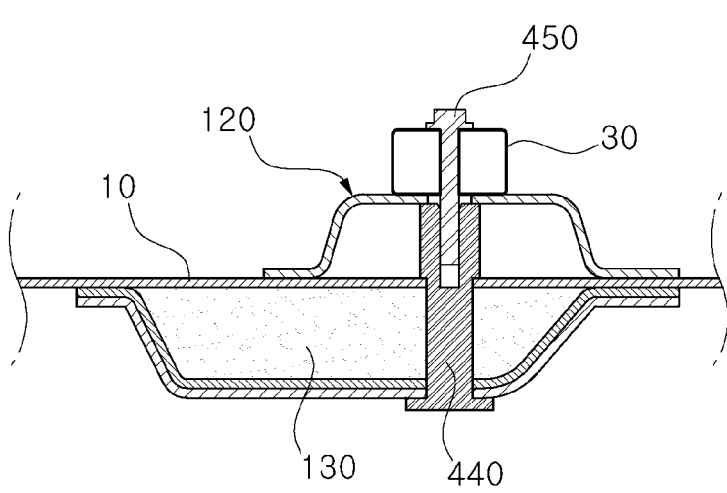

Then, FIG. 14 illustrates an application embodiment of the seat cross member assembly according to an embodiment of the present disclosure and is a case in which a pipe nut 440 is deformed and fastened to a fastening bolt 450 based on the embodiment of FIG. 4.

That is, unlike the above-described embodiment, the seat cross member assembly has a structure in which the pipe nut 440 is inserted through a fastening hole formed in the seat cross lower member 110 from the lower direction of the seat cross lower member 110, passes through the nut hole 130-1 of the bulk head 130 formed to correspond thereto and the fastening hole formed in the floor panel, and is fastened to the fastening bolt passing through the fastening hole formed in the seat cross upper member 120.

By changing a start point supporting the load to the seat cross lower member through such a method, it is possible to support a larger seat belt anchor load.

Although embodiments of the present disclosure have been described above with reference to the exemplary drawings, the embodiments of the present disclosure are not limited to the described embodiments, and it is apparent to those skilled in the art that various modifications and changes can be made without departing from the spirit and scope of the present disclosure. Therefore, these modified examples or changed examples should be included in the claims of the present disclosure, and the scope of embodiments of the present disclosure should be construed based on the appended claims.

What is claimed is:

1. A seat cross member assembly for a vehicle, the assembly comprising:
   a seat cross lower member coupled to a lower portion of a floor panel;
   a seat cross upper member coupled to an upper portion of the floor panel;
   a plurality of bulk heads mounted on the seat cross lower member and coupled to the floor panel;
   a plurality of nut holes provided in each of the plurality of bulk heads, respectively;
   a plurality of fastening holes provided in the floor panel, the plurality of fastening holes corresponding to the plurality of nut holes; and
   a plurality of pipe nuts, wherein the plurality of pipe nuts pass through the plurality of nut holes and the plurality of fastening holes, respectively.

2. The assembly of claim 1, wherein:
   both ends of the seat cross lower member are coupled to lower ends of a pair of rear side members, respectively; and
   both ends of the seat cross upper member are coupled to upper ends of the pair of rear side members, respectively.

3. The assembly of claim 1, wherein the plurality of bulk heads are mounted on the seat cross lower member by welds.

4. The assembly of claim 1, wherein the seat cross lower member is in contact with a lower surface of the floor panel, and wherein the seat cross lower member comprises a lower end, an extension extending upward from both ends of the lower end in a width direction, and an upper end connected to the extension to define a stepped portion with the lower end of the seat cross lower member.

5. The assembly of claim 4, wherein each of the plurality of bulk heads has a lower end mounted on the lower end of the seat cross lower member and an upper end in contact with the lower surface of the floor panel.

6. The assembly of claim 4, wherein the seat cross upper member comprises a lower end in contact with an upper surface of the floor panel, an extension extending upward from both ends of the lower end of the seat cross upper member in a width direction, and an upper end connected to the extension of the seat cross upper member to define a stepped portion with the lower end of the seat cross upper member.

7. The assembly of claim 6, wherein the seat cross upper member is fastened to the plurality of pipe nuts by a plurality of fastening bolts passing through a plurality of fastening holes provided in the upper end of the seat cross upper member.

8. The assembly of claim 1, wherein each of the plurality of pipe nuts passes through each of a plurality of fastening holes provided in the seat cross lower member.

9. A vehicle comprising:
   a vehicle body comprising a pair of rear side members on each side of the vehicle body in a vehicle width direction, a seat rail, and a floor panel;
   a seat cross lower member coupled to a lower portion of the floor panel and having both ends coupled to lower ends of the pair of rear side members, respectively;
   a seat cross upper member coupled to an upper portion of the floor panel and having both ends coupled to upper ends of the pair of rear side members, respectively;
   a plurality of bulk heads mounted on the seat cross lower member and coupled to the floor panel;
   a plurality of nut holes provided in each of the plurality of bulk heads, respectively;
   a plurality of fastening holes provided in the floor panel, the plurality of fastening holes corresponding to the plurality of nut holes; and
   a plurality of pipe nuts, wherein the plurality of pipe nuts pass through the plurality of nut holes and the plurality of fastening holes, respectively.

10. The vehicle of claim 9, wherein:
   the seat cross lower member is in contact with a lower surface of the floor panel;
   the seat cross lower member comprises a lower end, a lower extension extending upward from both ends of the lower end in a width direction, and an upper end connected to the lower extension to define a stepped portion with the lower end of the seat cross lower member;
   each of the plurality of bulk heads has a lower end mounted on the lower end of the seat cross lower member and an upper end in contact with the lower surface of the floor panel; and
   the seat cross upper member comprises a lower end in contact with an upper surface of the floor panel, an upper extension extending upward from both ends of the lower end of the seat cross upper member in a width direction, and an upper end connected to the upper extension to define a stepped portion with the lower end of the seat cross upper member.

11. The vehicle of claim 10, wherein the seat cross upper member is fastened to the plurality of pipe nuts by a plurality of fastening bolts passing through a plurality of fastening holes provided in the upper end of the seat cross upper member.

12. The vehicle of claim 9, wherein each of the plurality of pipe nuts passes through each of a plurality of fastening holes provided in the seat cross lower member.

13. The vehicle of claim 9, wherein the plurality of bulk heads are mounted on the seat cross lower member by welds.

14. The vehicle of claim 9, wherein the seat cross upper member is fastened to the plurality of pipe nuts by a plurality of fastening bolts, each of the plurality of fastening bolts passing through the seat rail and through a fastening hole provided in the seat cross upper member.

15. A method of assembling a seat cross member assembly mounted on a floor panel of a vehicle and coupled to a seat rail, the method comprising:
   coupling both ends of a seat cross lower member to lower ends of a pair of rear side members, respectively;
   mounting a plurality of bulk heads on the seat cross lower member;
   assembling the floor panel such that each of a plurality of pipe nuts passing through each of a plurality of nut holes provided in the plurality of bulk heads passes through each of a first plurality of fastening holes provided in the floor panel;
   corresponding a second plurality of fastening holes provided in a seat cross upper member to the plurality of nut holes and coupling each of both ends of the seat cross upper member to upper ends of the pair of rear side members, respectively; and
   allowing each of a plurality of fastening bolts passing through the seat rail to pass through each of the second plurality of fastening holes provided in the seat cross upper member and to be fastened to the plurality of pipe nuts.

16. The method of claim 15, wherein mounting the plurality of bulk heads comprises mounting lower ends of the bulk heads on a lower end of the seat cross lower member, wherein upper ends of the bulk heads are in contact with a lower end of the floor panel by the assembling of the floor panel.

17. The method of claim 16, wherein the second plurality of fastening holes are provided in an upper end of the seat cross upper member.

18. The method of claim 15, wherein assembling the floor panel comprises performing assembling by allowing each of the plurality of pipe nuts to pass through each of a third plurality of fastening holes provided in the seat cross lower member.

19. The method of claim 15, wherein mounting the plurality of bulk heads on the seat cross lower member comprises welding the plurality of bulk heads to the seat cross lower member.

20. The method of claim 15, further comprising inserting each of the plurality of pipe nuts into a respective one of the plurality of nut holes provided in the plurality of bulk heads.

* * * * *